Patented July 7, 1931

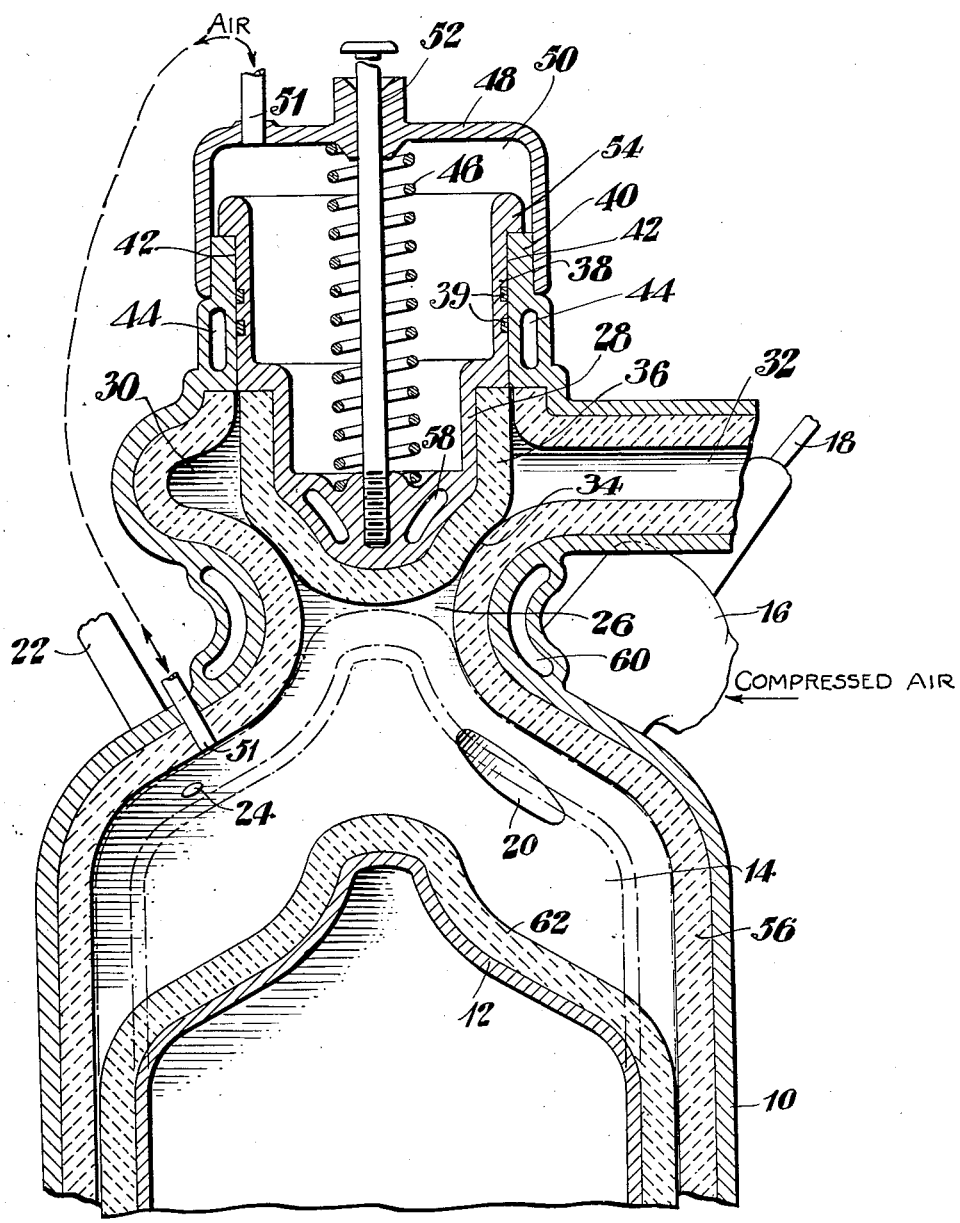

1,812,870

UNITED STATES PATENT OFFICE

WINDER E. GOLDSBOROUGH, OF SOUTH NORWALK, CONNECTICUT, ASSIGNOR TO DOHERTY RESEARCH COMPANY, OF NEW YORK, N. Y., A CORPORATION OF DELAWARE

VALVE TO CONTROL HIGH TEMPERATURE HIGH PRESSURE FLUIDS

Application filed April 14, 1928, Serial No. 269,975. Renewed November 14, 1930.

The present invention relates to valves and more particularly to valves for controlling fluids under high temperatures and pressures. In the operation of valves controlling high temperature fluids, much difficulty has been experienced in the past owing to the corrosion, pitting, burning, and deflection of the metal of the valves exposed to the high temperature fluids.

One of the objects of the present invention is to provide a valve in which the above mentioned difficulties are avoided.

It has been known, moreover, to water-cool parts of the valves exposed to high temperature fluids to reduce the deterioration of the valve and the operating difficulties caused by the high temperature. It has been found, however, that the cooling water for the valves has absorbed a large amount of heat and, in case of internal combustion engines and like types of apparatus, it has seriously reduced the efficiency of the machines in which the water-cooled valves have been used.

A second object of the present invention is to provide a valve, the metal parts of which may be water-cooled without causing an appreciable heat loss.

It has been proposed to control the flow of high temperature fluids by refractory valves. However, the refractory materials capable of withstanding high temperatures at the pressures ordinarily encountered have not been mechanically strong enough to withstand the shocks encountered in many types of machines and, so far as known to applicant, it has never been proposed to utilize refractory valves in internal combustion engines or like machines.

It is another object of the present invention to provide an arrangement for a refractory coated valve for handling high temperature and high pressure fluids which is adapted to minimize the mechanical shocks and wear to which the refractory of the valve is subjected.

The novel features of the present invention are pointed out with particularity in the appended claims. The invention itself, however, together with further objects and advantages, will best be understood from the following description taken in connection with the accompanying drawing, in which:

The figure is a central vertical section through the upper portion of the cylinder of an internal combustion engine according to the present invention.

The structure illustrated in the drawing is a particular embodiment of the present invention and comprises cylinder 10 within which is mounted to reciprocate a piston the body of which is not shown, but which has an extension 12. A combustion chamber 14 is formed between the cylinder 10 and the piston extension 12. In the arrangement illustrated, compressed air for supporting combustion is introduced into the chamber 14 from a source external to the cylinder 10. Said compressed air may be conveniently conducted into chamber 14 through a valve chamber 16 containing an inlet valve (not shown) whose stem is indicated at 18. The chamber 16 connects with the chamber 14 through inlet port 20. Within the chamber 14, air is burned with fuel for the production of power. The fuel for this purpose may be of any character, but it is preferred that liquid fuel be sprayed into the chamber 14, a convenient arrangement for this purpose being a fuel pipe 22 connecting with the chamber 14 through fuel port 24. Means for compressing the air and for supplying oil under sufficient pressure to spray the same into chamber 14 are known in the art and are not illustrated or described herein in detail. It will be understood moreover that the piston of which extension 12 forms a part is connected to a crank shaft in the usual manner.

When a charge of fuel and air has been burned and expanded in chamber 14, the piston extension 12 is thereby forced down to its lowest position. On the return stroke of the extension 12, the highly heated gases are forced out through a valve. The valve at the outlet of chamber 14 may be either an exhaust valve or a transfer valve, but in any case it is subject to very high temperatures during the passage of the gases. Moreover, during the combustion of fuel in chamber 14 the outlet valve must withstand high pressures as well as high temperatures. These conditions are the cause of corrosion and other troubles mentioned above to which metal valves are subject when used for controlling high temperature and high pressure fluids.

According to the present invention these difficulties are avoided by covering all surfaces of the valve which are in time brought into contact with the high temperature fluids with refractory. In the arrangement illustrated, gases from the chamber 14 pass out through an exhaust port 26 which is normally closed by a valve 28. When the valve is opened, the gases may pass from port 26 into a valve chamber 30 from which they may escape through an outlet pipe 32. The valve 28 contacts with its seat along the line 34 lying intermediate the port 22 and the valve chamber 30. As is clearly illustrated in the drawing, the valve 28 has a covering or coating 36 over all the surface of the valve exposed to the hot gases. The covering 36 is of a refractory material which is not substantially affected by the gases at the temperatures encountered in the operation of heavy oil engines as now used, and is also sufficiently hard and dense so that it effectively prevents escape of high pressure and temperature gases from chamber 14.

The valve 28 comprises a hollow metal base or shell 38 open at the end opposite the seat 34 and covered with refractory such as 36 at its rounded closed end. Above the refractory coating 36 the metal shell 38 contacts with and is guided by a metal guide 40 formed at the upper end of the cylinder 10 above the valve chamber 30. The bearing surface 42 intermediate guide 40 and the shell 38 is lubricated by any desired means (not shown) and in order to prevent the hot gases from chamber 30 from adversely affecting the lubricant on the surface 42, the guide 40 is preferably water cooled as indicated at 44.

The valve 28 is preferably held against its seat along the surface 34 by a spring 46. The upper end of the spring 46 thrusts against the cap 48 carried by the guide 40. Cap 48 preferably makes an air tight joint with guide 40 along the line of the surface 49 so that the valve 28 is enclosed at one end in an air tight chamber 50 formed by cap 48 and guide 40. Escape of products of the combustion along the surface 42 is thereby prevented. In case the chamber 50 is not air tight, piston rings 39 preferably are provided on the metal portion 38 to prevent leakage of the gases along the surface 42. If desired, the spring 46 may be omitted or made quite light and the valve normally held on its seat by gas pressure in the chamber 50, or an equalization of pressures in chambers 26 and 50 may be maintained by suitable conduits 51 which may be opened or throttled. In the arangement illustrated, means for opening the valve 28 to permit gases to pass out through port 26 comprises a stem 52 passing through the cap 48. It will be understood that means (not shown) are provided for operating the stem 52 in any known or desired manner to open valve 28.

While the material of coating 36 is resistant to abrasion by the gases, it is desirable that it be relieved of severe mechanical shock. For this purpose, the upper end of the metal shell of valve 28 is provided with a shoulder 54 contacting, when the valve is closed, with the upper edge of the guide 40. The length of the valve 28 and the height of the guide 40 are carefully adjusted so that the coating 36 does not pound when the valve closes, but merely makes, when closed, a close enough fit with its seat along the surface 34 to prevent the escape of material quantities of gases at the period of maximum pressure within the chamber 14. Preferably when the valve 28 is closed, a clearance of the order of 1/1000 of an inch exists between the valve and its seat along the line 34.

As above mentioned, the valve 28 has a refractory coating over those portions of its surface in contact with hot gases. Preferably also the cylinder 10, chamber 30 and outlet passage 32 are also all coated as to surfaces in contact with the hot gases with a refractory lining or coating 56. One difficulty encountered in using refractory coatings and linings in internal combustion engines and like machines has been the tendency of the refractory to check or flake. It has been found that this tendency is due in a large measure to the fact that corners of the refractory attain higher temperatures than the flat or circular surfaces. It is an important feature of the present invention that the cylinder 10 and valve 28 are so formed that the refractory coatings 36 and 56 have no projecting corners which would absorb heat, all portions connecting surfaces extending in different directions being carefully rounded.

It has been found that refractory coatings in combustion chambers or the like are often damaged by abnormal pressures produced by the expansion of the metal surfaces supporting the refractory, caused by the metal becoming hot. In order to prevent damage from this cause, the metal shell 38 of the valve 28 is provided at its closed end with a water passage 58 lying immediately behind the portion of the refractory coating 36 along the line of the seat 34. Also the metal of the cylinder 10 is provided with a water passage 60 immediately back of the portion of the coating 56 along the line of the seat 34. By means of the cooling water in ducts 58 and 60, distance between the surfaces of the refractory coatings 36 and 56 where they come opposite one another along the line 34 is maintained constant. Undue pressure between the coatings 36 and 56 is thereby prevented.

The coatings 36 and 56 are of refractory material sufficiently non-conducting so that no material amount of heat is lost to the cooling water in the ducts 58 and 60.

It will be seen that the mating surfaces of coatings 36 and 56 along the line of the seat 34 are respectively a concave surface and a torus. However, the surfaces of both coatings along this line may be conical if desired.

The present invention will be understood not to be limited to a particular refractory for constructing the coatings 36 and 56. However, a refractory having the desired degree of hardness, density and non-conductivity of heat and which permits of being machined or ground within the limits of precision as required by its application to valves of internal cumbustion engines or the like, may be made as follows:

An aggregate preferably of zircon of which the individual grains are impervious to gas flow is so graded in its component sizes that when united with an aluminum hydroxide phosphoric acid bond and moulded the finished article shall itself be impermeable to gas flow. The bond is such that hardening at a low temperature of from 220 to 500° F. is feasible, and the formed article hardened within this temperature range will not shrink, become susceptible to thermal shock, permeable to gas flow or otherwise alter its characteristics until an average temperature exceeding 2500° is attained.

The word "refractory" as used in the following claims is intended to indicate a non-metallic material which shows no obvious signs of fusion after being heated to a temperature of 1580° C. or 2876° F. While the material above mentioned is particularly suitable, it is obvious that many other refractories which are refractory in the sense herein defined are known to those skilled in the art and suitable for use in conjunction with the present invention.

Preferably the piston extension 12 is provided with a refractory coating or covering 62 of the same character as coatings 36 and 56 previously described. It is preferred moreover that the extension 12 and the cylinder 10 be reduced to only a portion of the volume in the outlet port 26. The clearance between the coating 62 and the coating 56 over the greater portion of the area of the coating 62 may be of the order of $5/1000$ of an inch.

The refractory coated valve according to the present invention has been described above as controlling an outlet port from an engine cylinder, but it will be understood that the valve according to the present invention may be utilized also in controlling the inlet port to the combustion space of an engine, the latter use of the present type of valve being desirable whenever the air or gas introduced into the combustion space of an engine is highly preheated in a recuperator or like device. This valve, moreover, may be used for controlling any port for the passage of high temperature fluids whether the pressure be high or low. It will be understood, moreover, that I have described above only one embodiment of the present invention and that the invention is defined and limited solely by the appended claims.

Having thus described my invention, I claim:

1. The combination in an internal combustion engine of a power cylinder having an exhaust port, and a valve controlling said port, said cylinder and valve having refractory coverings on surfaces exposed to hot gases, said coverings presenting only flat and rounded surfaces to the gases whereby differences in temperature between different portions of the said coverings are minimized.

2. The combination in an internal combustion engine of a power cylinder having a port, a valve controlling said port, and means forming a seat for said valve, said valve having a refractory coating covering all surfaces of the valve coming in contact with the gases and making when the valve is closed a substantially gas tight fit with its seat at the temperatures and pressures developed in the engine cylinder.

3. The combination in an internal combustion engine of a cylinder having a port, a valve controlling said port, means forming a seat for said valve, said valve having a refractory coating covering the portions of the valve exposed to the hot gases and said seat including a refractory coating contacting with the coating on said valve when the valve is closed, said valve and seat including metal portions supporting said coatings and having ducts for cooling water adjacent said coatings along the line of contact between the valve and seat.

4. The combination in an internal combustion engine of a power cylinder having a port, a valve controlling said port, said valve having a refractory covering on the surfaces of the valve exposed to hot gases, and having a metal shell to which said coating is attached, a guide fixed to said cylinder and contacting with said shell, a cap fixed to said guide and forming therewith a substantially air tight chamber surrounding one end of the said valve, and means forming a seat for said valve at the end opposite said cap.

5. The combination in an internal combustion engine of a power cylinder having a port, a valve controlling said port, said valve having a refractory coating on the surfaces of the valve exposed to hot gases and including a metal shell on which said coating is mounted, said shell having a contact portion thereon, means forming a seat for said valve arranged to cooperate with said coating to close said port, and a member fixed with respect to said seat and contacting with said portion when the valve is closed, said portion and member being arranged to contact as the valve closes and to prevent the valve from delivering a blow to its seat.

6. A valve including a hollow metal shell and a refractory coating fixed to one end of said shell.

7. The combination of a valve including a hollow metal shell, said shell being closed at one end and having a refractory covering over said end, said shell having a cylindrical portion, and a water-cooled guide for said cylindrical portion.

8. The combination of a valve including a hollow metal shell closed and rounded at one end having a refractory coating over said end, a guide for said shell and a cap surrounding the end of said shell opposite said coating, said cap forming an air tight chamber with said guide to prevent the passage of gases between the guide and the shell.

9. A valve comprised of a hollow steel shell and a refractory coating fixed to said steel shell, and means whereby said refractory coating is saved from impact with the seat of said valve.

10. A valve coated with refractory, functioning with a seat also coated with refractory, and means whereby, in closing, said valve is saved from mechanical impact upon said seat.

11. A refractory coated valve having a refractory coated seat, and means whereby, upon the closing of said valve, the seal is made substantially impervious to gas flow without the valve and seat surfaces being in contact.

12. A refractory covered water cooled valve having a refractory covered water cooled seat.

13. A refractory covered water cooled valve having a refractory covered water cooled seat, and means whereby said valve during its closing is saved from impact upon its seat.

14. A refractory covered water cooled valve having a refractory covered water cooled seat, means whereby said valve during its closing is saved from impact upon its seat, and means whereby the same fluid pressure is maintained on both sides of said valve.

15. A refractory faced water cooled valve having a refractory surfaced seat.

16. A refractory faced water cooled valve having a refractory surfaced seat and means whereby said valve during its closing is saved from impact upon its seat.

17. A refractory faced valve having a refractory surfaced seat, means whereby said valve during its closing is saved from impact upon its seat, and means whereby the same fluid pressure is maintained on both sides of said valve.

In testimony whereof I affix my signature.

WINDER E. GOLDSBOROUGH.